(12) United States Patent
Pautis et al.

(10) Patent No.: US 10,464,683 B2
(45) Date of Patent: Nov. 5, 2019

(54) AIRCRAFT ENGINE ASSEMBLY, COMPRISING FLEXIBLE FORCE TRANSMITTING DEVICES RADIALLY ARRANGED BETWEEN THE THRUST REVERSAL COWLS AND THE ENGINE

(71) Applicant: AIRBUS OPERATIONS (S.A.S.), Toulouse (FR)

(72) Inventors: Olivier Pautis, Merville (FR); Wolfgang Brochard, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 385 days.

(21) Appl. No.: 15/458,567

(22) Filed: Mar. 14, 2017

(65) Prior Publication Data

US 2018/0118355 A1    May 3, 2018

(30) Foreign Application Priority Data

Mar. 15, 2016  (FR) ...................... 16 52159

(51) Int. Cl.
*B64D 27/18* (2006.01)
*B64D 27/26* (2006.01)
*B64D 29/06* (2006.01)

(52) U.S. Cl.
CPC ............ *B64D 27/18* (2013.01); *B64D 27/26* (2013.01); *B64D 29/06* (2013.01);
(Continued)

(58) Field of Classification Search
CPC ........ B64D 27/18; B64D 27/26; B64D 29/06; B64D 2027/264; B64D 2027/266; Y02T 50/44
(Continued)

(56) References Cited

U.S. PATENT DOCUMENTS 4,044,973 A * 8/1977 Moorehead ............ B64D 27/20
                                                    244/54
2005/0194493 A1   9/2005 Marche
(Continued)

FOREIGN PATENT DOCUMENTS

CA    2960264 A1 *  9/2017  ............ B64D 27/26
FR    3 014 841 A1    6/2015
(Continued)

OTHER PUBLICATIONS

French Search Report for Application No. 1652159 dated Sep. 20, 2016.

*Primary Examiner* — Samir Abdosh
(74) *Attorney, Agent, or Firm* — Jenkins, Wilson, Taylor & Hunt, P.A.

(57) ABSTRACT

To reduce flexural deformations of an engine, an engine assembly comprises a device for attaching the engine onto a structure of an aircraft, the attachment device including a primary structure, an attachment device for attaching the engine onto the primary structure of the attachment pylon, and a nacelle including thrust reversal cowls, each equipped with an inner structure arranged around a case portion of the engine. The assembly includes flexible devices for transmitting forces, arranged between the case portion and the inner structures of the cowls, each device including an elastically deformable device configured so that in the closed position of the cowl, with the engine at a standstill, it adopts a partial elastic deformation state allowing the device to apply a prestress force on the case portion.

15 Claims, 11 Drawing Sheets

(52) U.S. Cl.
CPC .. *B64D 2027/264* (2013.01); *B64D 2027/266* (2013.01); *Y02T 50/44* (2013.01)

(58) Field of Classification Search
USPC .......................................................... 244/54
See application file for complete search history.

(56) References Cited

U.S. PATENT DOCUMENTS

| | | | |
|---|---|---|---|
| 2010/0001123 A1* | 1/2010 | Hillereau | B64D 29/06 244/54 |
| 2010/0040466 A1* | 2/2010 | Vauchel | B64D 27/18 415/213.1 |
| 2011/0168837 A1 | 7/2011 | Balk et al. | |
| 2011/0173949 A1 | 7/2011 | Provost | |
| 2012/0111995 A1 | 5/2012 | Lafont | |
| 2012/0111996 A1 | 5/2012 | Lafont | |
| 2014/0064950 A1 | 3/2014 | Brochard et al. | |
| 2014/0130512 A1 | 5/2014 | Chouard et al. | |
| 2015/0166192 A1 | 6/2015 | Ewens et al. | |
| 2018/0118355 A1* | 5/2018 | Pautis | B64D 27/26 |

FOREIGN PATENT DOCUMENTS

| | | | |
|---|---|---|---|
| GB | 2493613 A | 2/2013 | |
| GB | 2518488 A | 3/2015 | |
| GB | 2549600 A * | 10/2017 | B64D 27/26 |

* cited by examiner

AIRCRAFT ENGINE ASSEMBLY, COMPRISING FLEXIBLE FORCE TRANSMITTING DEVICES RADIALLY ARRANGED BETWEEN THE THRUST REVERSAL COWLS AND THE ENGINE

CROSS-REFERENCE TO RELATED APPLICATION

This patent application claims priority to French Patent Application FR 16 52159 filed Mar. 15, 2016, the entire disclosure of which is incorporated by reference herein.

TECHNICAL FIELD

The present disclosure relates to the field of engine assemblies for aircraft comprising a nacelle, an engine, and a device for attaching the engine to a structure of the aircraft, preferably under a wing of the aircraft. It preferably applies but is not limited to commercial airplanes.

BACKGROUND

In existing aircraft, the engines such as bypass and twin-spool turbojet engines are suspended underneath the wing structure or attached to the fuselage by complex attachment devices also referred to as EMSs (which stands for "engine mounting structure"), or else attachment pylons. The attachment pylons usually employed have a primary structure, also referred to as a rigid structure. This primary structure generally forms a box section, which means to say that it is made by assembling lower and upper longitudinal members joined together by a plurality of transverse stiffening ribs situated inside the box section. The longitudinal members are arranged on the lower and upper faces, while lateral panels close the box section on the lateral faces.

The primary structure of these attachment devices is designed to allow the static and dynamic loads generated by the engines, such as the weight, thrust or else various dynamic loads to be transmitted to the wing structure.

In solutions known from the prior art, the transmission of force between the engine and the primary structure is performed by attachments made up of a forward engine mount, a rear engine mount and a thrust force reacting device. These elements together form a statically determinate attachment system.

Usually, the forward engine mount is fixed to the outer ring section of an intermediate case or to the fan case, as disclosed in document FR 3 014 841. Alternatively, this forward engine mount may be attached to the hub of the intermediate case, connected by radial arms to the aforementioned outer ring section. The rear engine mount itself connects the primary structure to the exhaust case of the engine, situated at the rear end of this engine.

The attachment thus ensures that force is transmitted to the pylon, while at the same time limiting the internal deformation of the engine. However, ultra-high bypass ratio engines have a fan of increasingly high diameter, with a view to improving their performance in terms of fuel consumption. However, this sizing generally causes an increase in the flexibility of the engine, the consequence of this being a drop in performance associated with the turbine blade tip clearances. Specifically, the flexural deformation of the engine leads to wearing of the blades of the high-pressure and low-pressure turbines and compressors, which creates significant clearances at the blade tips and reduces the performance/efficiency of the engine (or increases its fuel consumption).

There is therefore still a need to limit the deformation of the engine.

SUMMARY

In order at least partially to address this need, one subject of the disclosure herein is an aircraft engine assembly comprising:
  a bypass engine;
  a device for attaching the engine to a structure of the aircraft, the attachment device comprising a primary structure;
  an attachment for attaching the engine to the primary structure of the attachment pylon; and
  a nacelle comprising thrust reversal cowls, each equipped with an inner structure and with an outer structure between them delimiting or defining a duct for the circulation of a bypass flow of the engine, the inner structure being arranged around a case portion of the engine.

According to the disclosure herein, the engine assembly comprises a plurality of flexible devices for transmitting forces which are arranged, preferably radially, between the case portion and the inner structures of the thrust reversal cowls, each flexible force transmitting device comprising an elastically deformable structure or device configured so that in the closed position of the thrust reversal cowl, with the engine at a standstill, it adopts a partial elastic deformation state allowing the force transmitting device to apply a prestress force to the case portion.

The disclosure herein therefore proposes the interposition of elastic devices between the thrust reversal cowls and the case portion they surround, so as to reduce flexural deformation of the engine. In other words, these devices which are specific to the disclosure herein make it possible to reduce the movements of the engine case, by resting against the thrust reversal cowls which thus absorb more force than in configurations of the prior art. As a result, turbine blade tip wear is lower, making it possible to improve the overall efficiency of the engine.

Furthermore, the state of partial elastic deformation of the deformable structure or device, when the thrust reversal cowl is in the closed position, means that the force transmitting device can be made to be permanently active, for greater limiting of the engine deformation. Since the state of elastic deformation is only partial when the engine is at a standstill (first level of preload stress applied when the cowls are closed), the deformable structure or device may thus continue to deform elastically when the engine is in operation. Specifically, as the propulsion assembly comes up to temperature, expansions of the engine case and of the substructures make it possible to increase the preload stress, in order to reach a nominal level. The result of this is the application of a reaction force of greater intensity to the case portion concerned, thereby allowing even better controlled flexural deformation. Furthermore, when the thrust reversal cowls are closed, it is easy for an operator to load the deformable structure or device in order to achieve the desired partial elastic deformation.

In this regard, it may be noted that the nominal state of preload of the flexible system is achieved by the mechanical preload associated with the closing of the cowls and with thermomechanical preload created by the propulsion assembly coming up to temperature (increase in the diameter of the engine case). In this way, the system has low stiffness to make the closing of the cowls easier, and the stiffness increases under thermomechanical effects so as to better constrain the engine and limit the movements thereof.

The disclosure herein may also have at least one of the following additional features, considered in isolation or in combination.

The case portion corresponds to any one of the following portions:
- a portion of a central case of the engine enclosing a combustion chamber;
- a portion of the central case of the engine enclosing a turbine; or
- a portion of the exhaust case of the engine.

Alternatively, it may be a portion of the central case of the engine enclosing a compressor.

The elastically deformable structure or device is secured to the case portion, or secured to the inner structure of the thrust reversal cowl. It could also be secured to the case portion and to the inner structure of the cowl by being made as two distinct portions cooperating with one another.

The engine assembly also comprises a plurality of rigid force transmitting devices arranged between the case portion and the inner structures of the thrust reversal cowls, each rigid force transmitting device being arranged so that in the closed position of the thrust reversal cowl, with the engine at a standstill, a radial clearance remains between this rigid device and the case portion or between this rigid device and the inner structure of the thrust reversal cowl, so that the rigid force transmitting device is in an inactive state. Thus, it is only above a certain level of engine deformation that the rigid devices become active, namely once the radial clearances have been absorbed.

The distribution of the flexible force transmitting devices about a longitudinal axis of the engine, in a circumferential direction thereof, is irregular. Alternatively, the distribution may be regular, without departing from the scope of the disclosure herein.

In the preferred case in which the distribution is irregular, this distribution is such that the density of flexible force transmitting devices arranged in a half-section of the engine opposite to the attachment device is greater than the density of force transmitting devices arranged in another half-section of the engine situated facing the attachment device. That makes it possible to benefit from greater rigidity in the half-section of the engine that is opposite to the attachment device, namely at the point where engine deformation is the greatest. This particular feature could also be obtained by differentiating the stiffness of the elastically deformable structure or device.

The elastically deformable structure or device can take the form of one of the following elements, or of a combination thereof:
- a spiral spring;
- a spiral spring operating in compression;
- a leaf spring having one or more leaves;
- a circular cables spring;
- an elastomer block;
- a metal cushion.

Each flexible force transmitting device comprises a force transmitting interface defined by a first end piece secured to the case portion, and by a second end piece secured to the inner structure of the thrust reversal cowl.

According to a first embodiment, the first and second end pieces are contacting plates, defining a substantially planar interface. Nevertheless, a slight curvature on these plates is possible so that they adapt to the curvature of the case portion or to that of the inner structure of the thrust reversal cowl. Alternatively, the plates of several flexible force transmitting devices could be replaced by a single support bow fixed to the case portion, or to the inner structure of the thrust reversal cowl.

For preference, the second end piece, in the form of a plate, is fixed to one end of the elastically deformable structure or device, and/or the first end piece, in the form of a plate, is fixed to the case portion. The latter fixing may be direct, or indirect with the interposition of an intermediate structure between the two entities.

According to a second preferred embodiment, of the first and second end pieces, one is a male element in the form of a finger having a cross section that narrows in the direction of the other end piece, the latter being a female element in the form of a socket accepting the finger and having a shape that complements that of this finger. By virtue of this male/female cooperation, the flexible devices advantageously react force in three orthogonal directions.

For preference, the first end piece is secured to an intermediate reinforcement fixed to the case portion, the intermediate reinforcement being arranged between the first end piece and the case portion.

For preference, the intermediate reinforcements associated with at least two flexible devices that are directly consecutive in the circumferential direction are connected to one another preferably forming a one-piece component. A fixing bow may potentially be arranged between this one-piece component and the case portion, or alternatively, this one-piece component is fixed directly to this case portion.

Alternatively, each intermediate reinforcement comprises link rods articulated at their ends. For preference, these are pairs of link rods arranged in a V, with their point oriented radially towards the outside.

Another subject of the disclosure herein is an aircraft comprising at least one such engine assembly, preferably fixed under a wing of this aircraft.

Other advantages and features of the disclosure herein will become apparent from the nonlimiting detailed description hereinbelow.

BRIEF DESCRIPTION OF THE DRAWINGS

This description will be given with reference to the attached drawings among which.

DETAILED DESCRIPTION

Figure 1:
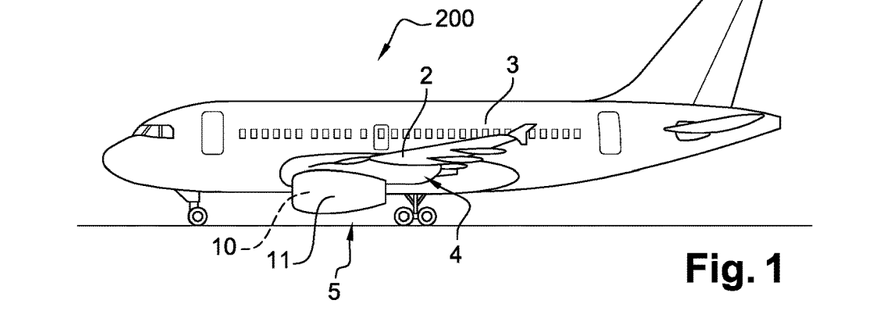
FIG. 1 depicts a side view of an aircraft comprising engine assemblies according to the disclosure herein.

Reference is made to FIG. 1 which depicts an aircraft 200 comprising a fuselage 3 to which two wing structure elements 2 are fixed (only one is visible in FIG. 11), each wing structure element bearing an engine assembly 5 according to the disclosure herein. This engine assembly 5, also referred to as a propulsion unit, comprises a twin spool bypass engine 10, such as a turbojet engine, a device 4 for attaching the engine 10, also referred to as an attachment pylon, and a nacelle 11 surrounding the engine. In the conventional way, the engine assembly 5 is suspended under its wing 2.

Throughout the description which will follow, by convention, the direction X corresponds to the longitudinal direction of the device 4 which is also likenable to the longitudinal direction of the turbojet engine 10 and to that of the engine assembly 5, this direction X being parallel to a longitudinal axis 6 of this turbojet engine 10. Furthermore, the direction Y corresponds to the direction oriented transversely with respect to the device 4 and also likenable to the transverse direction of the turbojet engine and to that of the engine assembly 5, and the direction Z corresponds to the vertical or heightwise direction, these three directions X, Y and Z being mutually orthogonal.

Furthermore, the terms "forward" and "rear" are to be considered in relation to a direction of forward travel of the aircraft taken as a result of the thrust exerted by the turbojet engines 10, this direction being depicted schematically by the arrow 7.

Reference is made to FIGS. 2 to 4b which depict the engine assembly 5 in greater detail. The nacelle 11 comprises, from the front towards the rear, an air intake 16, fan cowls 18, thrust reversal cowls 20 and an exhaust system 22 which is fixed to the rear of the turbojet engine.

The thrust reversal cowls 20 are preferably two in number, each in the overall shape of a half-shell articulated at its upper end to a primary structure 8 of the attachment pylon, as will be detailed hereinafter.

Each cowl 20 has an inner structure 26 or IFS (which stands for inner fixed structure) and an outer structure 28 or OFS (which stands for outer fixed structure). The two structures 26, 28 are substantially concentric and between them define a flow duct 30 through which a stream of bypass air 32 of the turbojet engine circulates. This stream of bypass air 32 combines with the primary stream of gases 33 depicted schematically in FIG. 2a.

Figure 2:
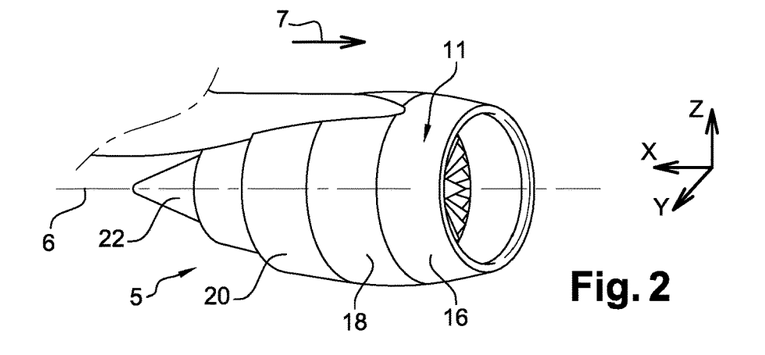
FIG. 2 depicts a perspective view of one of the engine assemblies of the aircraft shown in the preceding figure.
Figure 2A:
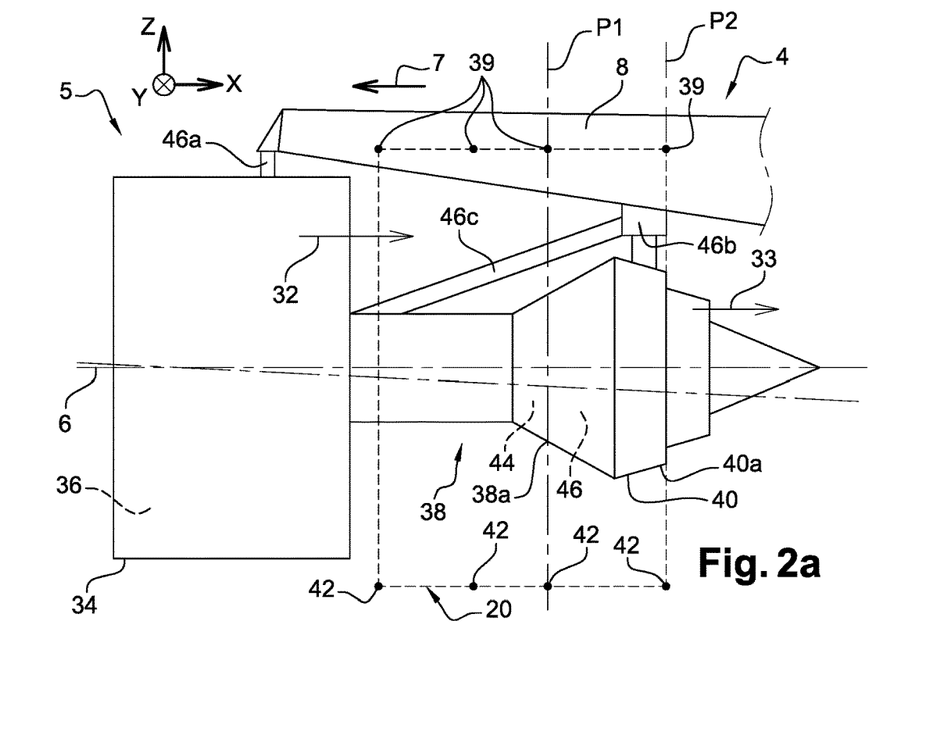
FIG. 2a is a schematic side view of part of the engine assembly shown in the preceding figure.
Figure 3:
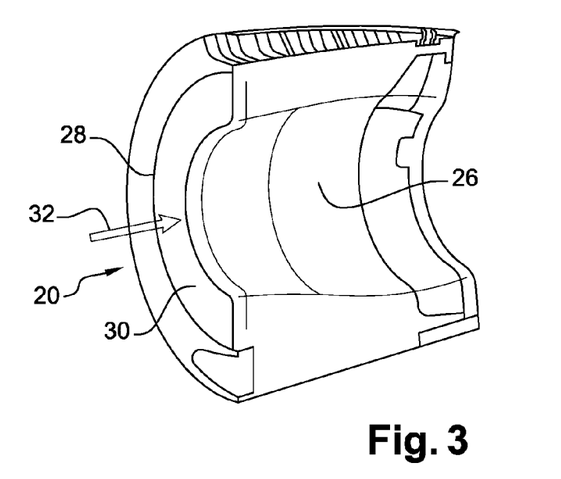
FIG. 3 is a perspective view of one of the two thrust reversal cowls forming an integral part of the nacelle with which the engine assembly shown in FIG. 2 is equipped.
Figure 4A:
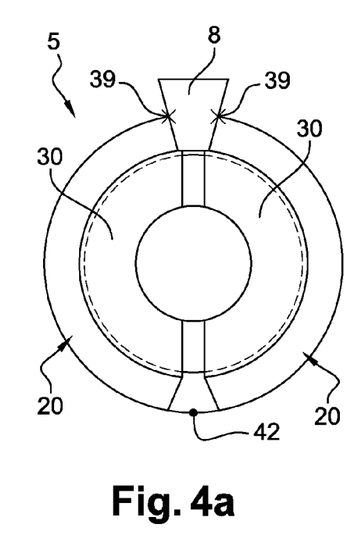
FIGS. 4a and 4b are schematic face-on views of the engine assembly shown in FIG. 2, with the thrust reversal cowls in the closed position and in the open position, respectively.
Figure 4B:
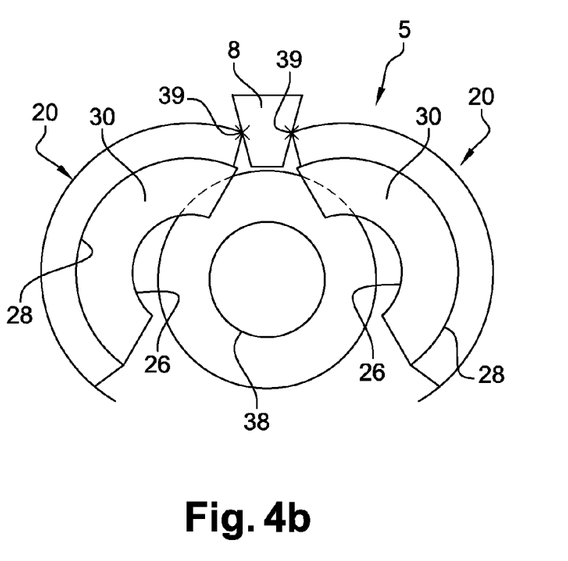

Reference is made more particularly to this FIG. 2a which depicts part of the engine assembly 5 intended to be fixed under the wing, using a series of attachments (not depicted) attached to the primary structure 8.

FIG. 2a depicts the primary structure 8 of the attachment device 4 but not the secondary structures attached to this primary structure 8. These secondary structures are conventional. They segregate and hold systems while at the same time supporting the aerodynamic fairing elements.

The turbojet engine 10 at the front has a fan case 34 of large size, delimiting or defining an annular fan duct 36. Towards the rear it comprises a central case 38 of smaller size which widens at its rear end, which is itself secured to a gas exhaust case 40.

The thrust reversal cowls 20 are each articulated to the primary structure 8 by hinges 39 spaced apart in the direction X. The cowls 20 which surround the cases 38, 40 are fixed to one another at their lower end by conventional latching mechanisms 42 known as latches. The number of hinges 39, just like the number of latching mechanisms 42, is set at four for example.

The primary structure 8 of the attachment device 4 adopts a conventional shape, essentially comprising a central box structure extending from the rear forwards substantially in the direction X. The central box section is provided with transverse stiffening ribs (not depicted) each taking the form of a rectangle oriented in a plane YZ. The hinges 39 are fixed to the lateral panels of the central box structure 8, in such a way that their fixing structure or device cooperates with the transverse stiffening ribs.

Each thrust reversal cowl 20 in particular covers a first case portion 38a corresponding to a portion of the central case 38 enclosing a combustion chamber 44, or enclosing a turbine 46. This first case part 38a is situated in a first transverse plane P1 of the turbojet engine, which passes through one of the hinges 39 articulating the cowl 20, preferably the third articulation from the front. Each thrust reversal cowl 20 also, with its rear end, covers a second case portion 40a corresponding to a portion of the exhaust case 40. This second case portion 40a is situated in a second transverse plane P2 of the turbojet engine.

Still with reference to FIG. 2a, the engine assembly 5 comprises structures or devices for attaching the primary structure 8 to the turbojet engine 10. These comprise a forward engine mount 46a connecting the front end of the box structure 8 to the fan case 34. They also comprise a rear engine mount 46b connecting the exhaust case 40 to a lower part of the box structure 8. Finally, these comprise two lateral link rods 46c for reacting thrust forces, these being articulated at their front ends to the central case 38 of the turbojet engine or to an intermediate case thereof. These elements 46a-46c together form a statically determinate system of force reacting mounts.

However, because of the large diameter of the fan case 34 in comparison with the diameters of the other cases of the turbojet engine, this case is subject to greater flexural deformation in relation to the present generation of engines. This flexural deformation takes place along its axis 6, during engine operation.

The disclosure herein seeks to solve this problem of flexural deformation by installing, in addition to the aforementioned attachments 46a-46c, flexible force transmitting devices between a case portion and the inner structures 26 of the thrust reversal cowls 20. More specifically, a series of flexible devices is arranged in the first transverse plane P1 and/or a series of flexible devices is arranged in the second transverse plane P2.

Figure 5:
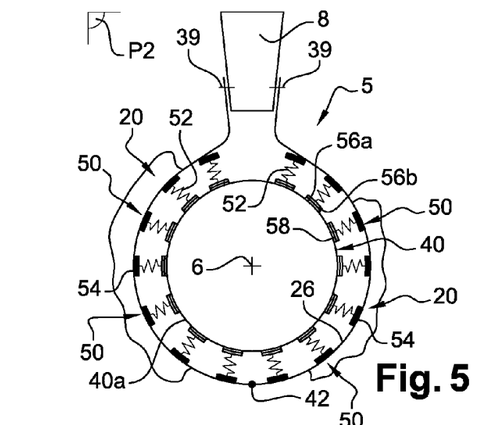
FIG. 5 is a schematic view in cross section of part of the engine assembly shown in FIG. 2, taken on the plane P2 of FIG. 2a, with the engine assembly as per a first preferred embodiment of the disclosure herein.

Reference is now made to FIG. 5 which depicts the engine assembly 5 according to a first preferred embodiment of the disclosure herein. In this first embodiment, the flexible devices 50 are arranged in the transverse plane P2 and distributed regularly in the circumferential direction about the axis 6. The number of flexible devices 50 associated with each cowl 20 is preferably comprised between one and eight. Each flexible device 50 is interposed radially between the inner structure 26 of one of the thrust reversal cowls 20 and the case portion 40a of the exhaust case 40.

Each device 50 is defined as having a flexible nature because of the incorporation of an elastically deformable structure or device 52, for example a spiral spring preferably operating in compression. This deformable structure or device 52 is therefore advantageously intended to deform elastically, becoming loaded under the action of the case portion 40a which deforms flexurally during turbojet engine operation. By becoming loaded in this way, the flexible device 50 transmits force to the inner structure 26 of the cowl 20, which thus takes on a structural nature. Because of this absorption of force, the engine mounts 46a, 46b are unloaded, and the flexing of the turbojet engine is lessened. As a result, turbine blade tip wear is reduced, thereby increasing the overall efficiency of the engine.

When the thrust reversal cowls 20 are in the closed position, each flexible device 50 has its deformable structure or device 52 in a state of partial elastic deformation. As a result, it applies a preload stress to the case portion 40a, and this allows the flexible device 50 to contribute to limiting the deformation of the turbojet engine in all phases of operation thereof.

Furthermore, the preload stress may easily be obtained by an operator, simply by closing the thrust reversal cowls 20, then latching them together. The nominal preload is itself obtained with the engine running, so as to apply thermomechanical preload.

In this first preferred embodiment, the elastically deformable structures or devices 52 are secured to the inner structures 26 of the cowls 20. Alternatively, they could be secured to the case portion 40a. When they are fixed to the inner structures 26, a fixing plate 54 may be interposed between an external radial end of the deformable structure or device 52 and the inner structure 26.

In addition, each flexible device 50 comprises a force transmitting interface 58. This interface 58 is defined by a first end piece 56a fixed directly to the case portion 40a, and by a second end piece 56b fixed to the internal radial end of the deformable structure or device 52. The two end pieces 56a, 56b in this instance are plates in surface contact, preferably defining an interface 58 of substantially planar form. Nevertheless, it is possible for these plates 56a, 56b to have a slight curvature so as to follow the local curvature of the case portion 40a.

Alternatively, the plate 56b could come directly into contact with the case portion 40a. Nevertheless, in the embodiment described, the presence of the other plate 56a on the case portion 40a allows this plate 56a to constitute a wearing component that is easy to replace.

Figure 5A:
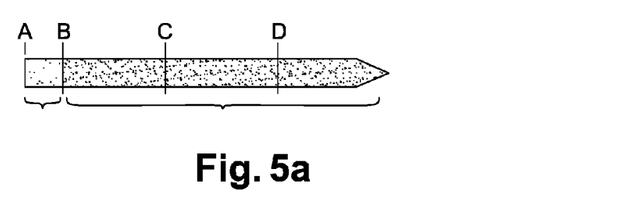
FIG. 5a schematically depicts the level of stress in the flexible force transmitting devices, as a function of the flexural deformations of the turbojet engine.

Reference is made to FIG. 5a which schematically depicts the level of stress in the flexible force transmitting devices 50, as a function of the flexural deformations of the turbojet engine. In this figure, the intensity of the shading is a function of the level of stress in the device 50. The point A corresponds to an open position of the thrust reversal cowls, while the point B corresponds to a closed position of the thrust reversal cowls with the turbojet in operation. The point C corresponds to a turbojet engine limit load level as encountered in operation while point D corresponds to an ultimate load level.

For this preferred embodiment, it may be pointed out that, between the points A and B, the preload resulting from simply closing the thrust reversal cowls 20 is of small intensity. Thereafter, from point B (mechanical and thermomechanical preload) as far as beyond point D, the stress loading becomes higher but is such that the deformation of the structure or device 52 remains in the elastic domain.

Figure 6:
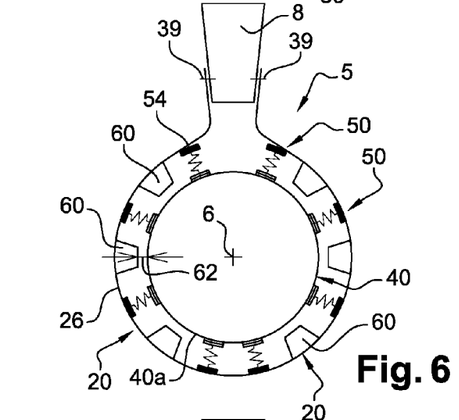
FIGS. 6 to 7a depict views similar to those of FIGS. 5 and 5a, with the engine assembly as per alternative forms of the first embodiment.

FIG. 6 depicts an alternative form of embodiment in which the flexible devices 50 are combined with rigid devices for transmitting force between the case portion 40a and the inner structure 26 of the cowl 20. Each rigid device 60 is supported fixedly by the inner structure 26. It is arranged in such a way that when the cowl 20 is in the closed position, with the engine at a standstill, a radial clearance 62 is present between this device 60 and the case portion 40a. As a result, the devices 60 remain in an inactive state when the turbojet engine is at a standstill, only the flexible devices 50 providing a preloading stress on the case portion 40a. The devices 60 are qualified as rigid because they are not intended to deform elastically like the devices 50. Rather, they are designed to constitute rigid points of support for the turbojet engine when the latter reaches a certain level of deformation while it is in operation. The rigid devices 60 here are pads extending substantially radially towards the inside from the inner structure 26, these pads preferably being hollow and of substantially rectangular, square, trapezoidal or some other shape.

In this alternative, the devices 50, 60 are arranged so that they alternate in the circumferential direction. The layout is such that the distribution of the flexible devices 50 in the circumferential direction remains uniform/regular.

Figure 6A:
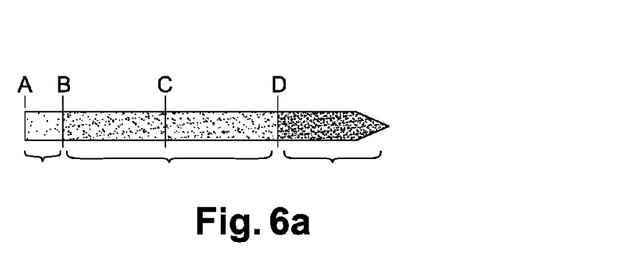

In this alternative form of embodiment, as is shown in FIG. 6a, it may be pointed out that, between the points B and D, the stress loading on the deformable structure or device 52 increases, still within the domain of elastic deformation of the deformable structure or device 52. At the point D, the level of deformation of the turbojet engine is such that one or more of the rigid devices 60 become active and contribute to limiting the deformation of the turbojet engine, in combination with the flexible devices 50.

Figure 7:
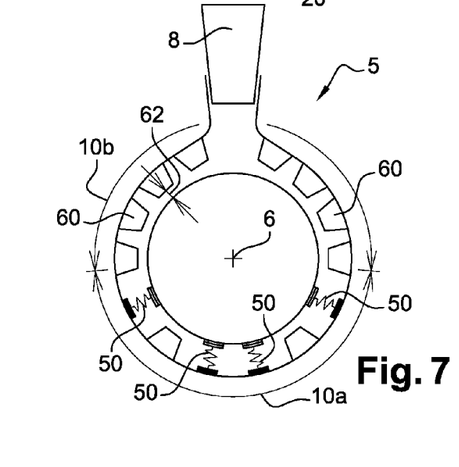

FIG. 7 depicts another alternative form of embodiment in which the flexible devices 50 are still combined with rigid force transmitting devices 60. However, the number of flexible devices 50 is lower, and their distribution in the circumferential direction is no longer regular. Specifically, the density of flexible devices 50 arranged in a half-section 10a of the turbojet engine opposite to the rigid structure 8 is greater than the density of flexible devices 50 arranged in another half-section 10b situated facing this structure 8. In this alternative, the principle is taken to the extreme given that no flexible device is installed in the upper half-section 10b. Thus, only the lower half-section 10b is equipped with such flexible devices 50, making it possible to enjoy greater rigidity at this point where the deformation of the turbojet engine is at its greatest during operation.

Figure 7A:
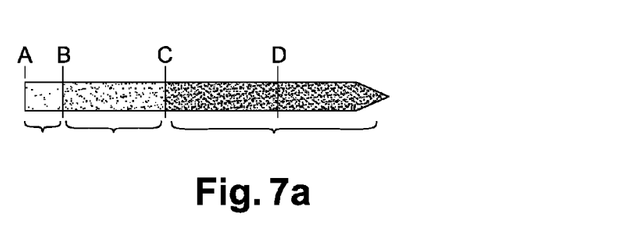

In this alternative form of embodiment, as shown in FIG. 7a, the lower density of flexible devices 50 means that the rigid devices 60 become active sooner, even before the point C, from an intermediate level of turbojet engine loading.

The flexible structure or device 52 may be produced in various forms, for example using a conventional spiral spring as was describe hereinabove.

Figure 8A:
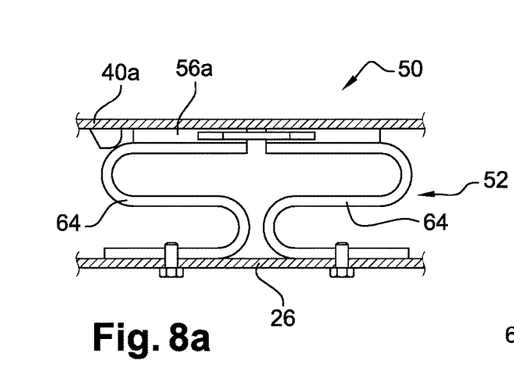
FIGS. 8a to 8e depict various possibilities for leaf springs for creating the elastically deformable structure or device with which the flexible force transmitting devices are equipped.
Figure 8B:
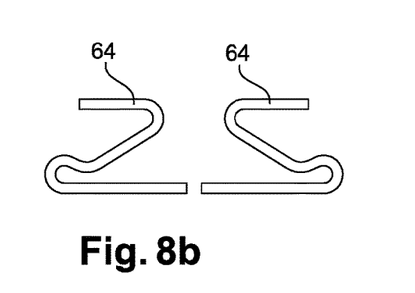
Figure 8C:
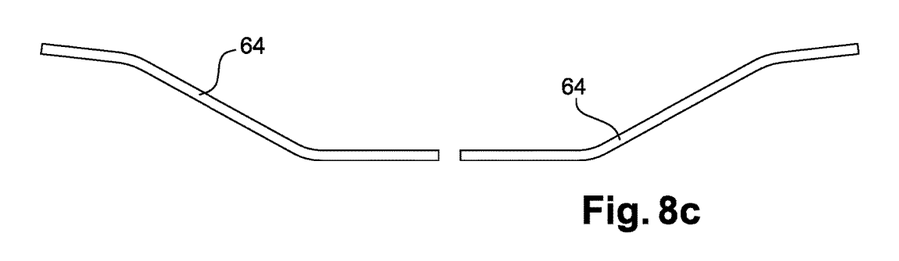
Figure 8D:
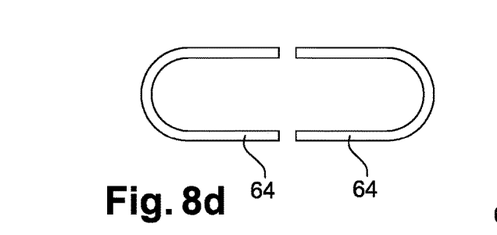
Figure 8E:
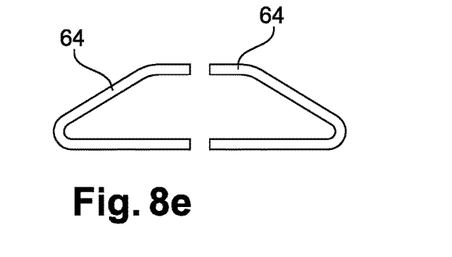

Nevertheless, other forms are possible, such as leaf springs. Such solutions have been depicted in FIGS. 8a to 8e. In FIG. 8a there is provided, for example, a two-leaf spring 64 with the two leaves arranged symmetrically, each of the leaves being in the overall shape of an S. The free end of the leaves 64 rests directly against the first end piece 56a secured to the case portion 40a. Alternatively, the free end of the leaves 64 could bear a second end piece to cooperate with the first end piece 56a, after the manner of the solution of FIG. 5.

The other embodiments envisaged and depicted in FIGS. 8b to 8e also each comprise two leaves 64 arranged symmetrically. Each leaf 64 has, in FIGS. 8b to 8e respectively, the overall shape of a Z, of a Z stretched-out widthwise, of a couched U, and of a couched triangle. Nevertheless, in order to achieve the desired stiffness, the shape of the leaves 64 may be adapted, notably in terms of their curvatures, thicknesses, number of convolutions, etc.

Figure 9:
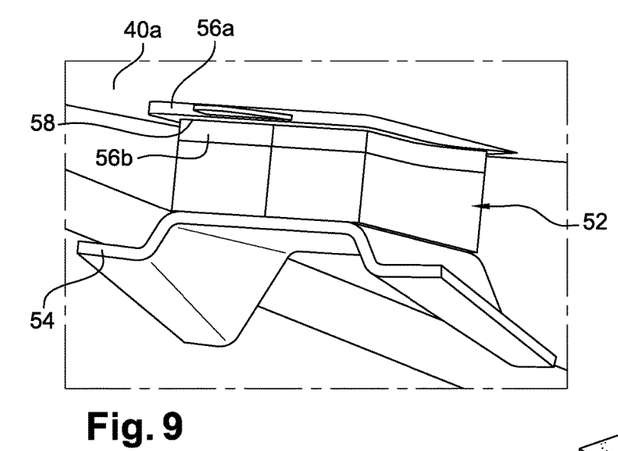
FIGS. 9 and 9a depict another solution with the elastically deformable structure or device taking the form of a metal cushion.
Figure 9A:
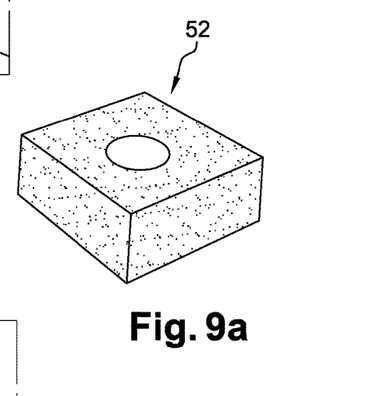

FIG. 9 depicts another form of embodiment of the elastically deformable structure or device 52 which in this instance is a metal cushion mounted on the fixing plate 54. The metal cushion 52, an example of which is shown in FIG. 9a, bears at its opposite end the second end piece 56b which cooperates with the first end piece 56a, fixed to the case portion 40a. The metal cushion 52 essentially makes it possible to react compressive loads, namely forces oriented substantially radially with respect to the axis of the turbojet engine. It should be noted that this cushion could be replaced by a block of elastomer, without departing from the scope of the disclosure herein.

Figure 10:
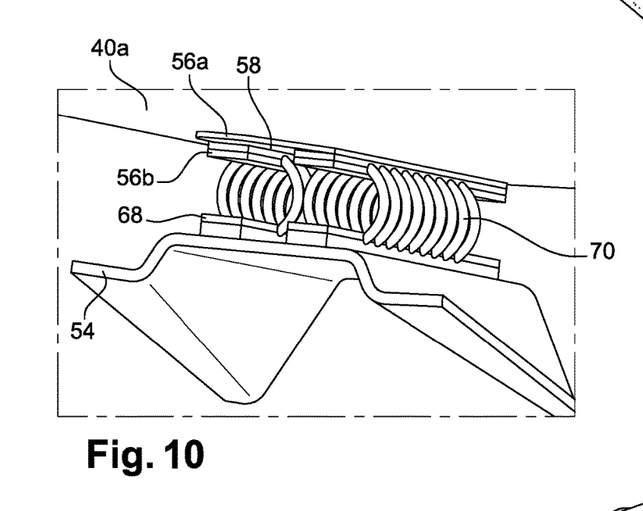
FIGS. 10 and 10a depict yet another solution with the elastically deformable structure or device taking the form of a circular cables spring.
Figure 10A:
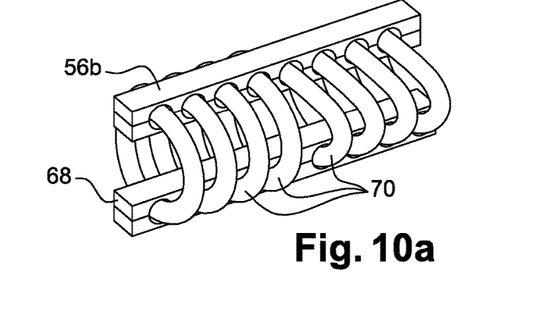

FIG. 10 shows yet another form of embodiment, in which the deformable structure or device 52 is a circular cables spring, also commercially available. More specifically, it comprises one or more metal cables 70 made into the shape of loops or circles, arranged against one another in such a way that their centres are substantially aligned along one and the same straight line. The second end piece 56b engages with a radially internal end of each of the cables 70, whereas another, diametrically opposite, similar piece 68 engages with a radially external end of each of these cables 70. The piece 68 is fixed to the fixing plate 54, while the second end piece 56b rests flat against the first end piece 56a fixed to the case portion 40a. The circular cables spring 70 makes it possible not only to react compressive force in the radial direction but also to react transverse force in the circumferential and longitudinal directions.

Figure 11:
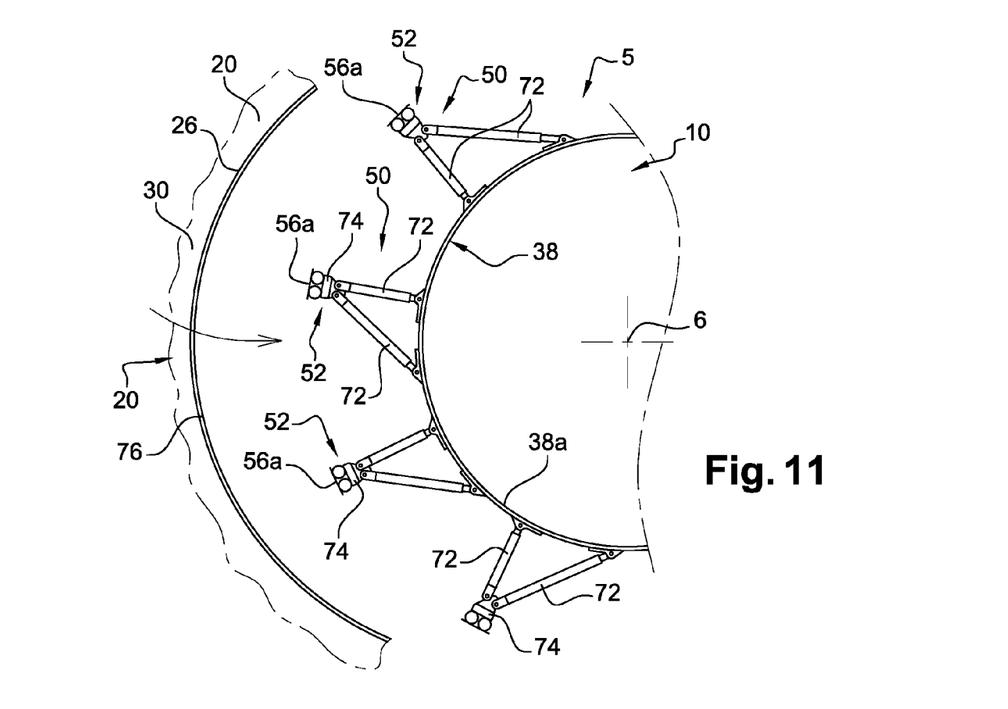
FIG. 11 depicts part of the engine assembly viewed face on with the thrust reversal cowl in the open position, according to another alternative form of the first preferred embodiment of the disclosure herein.
Figure 11A:
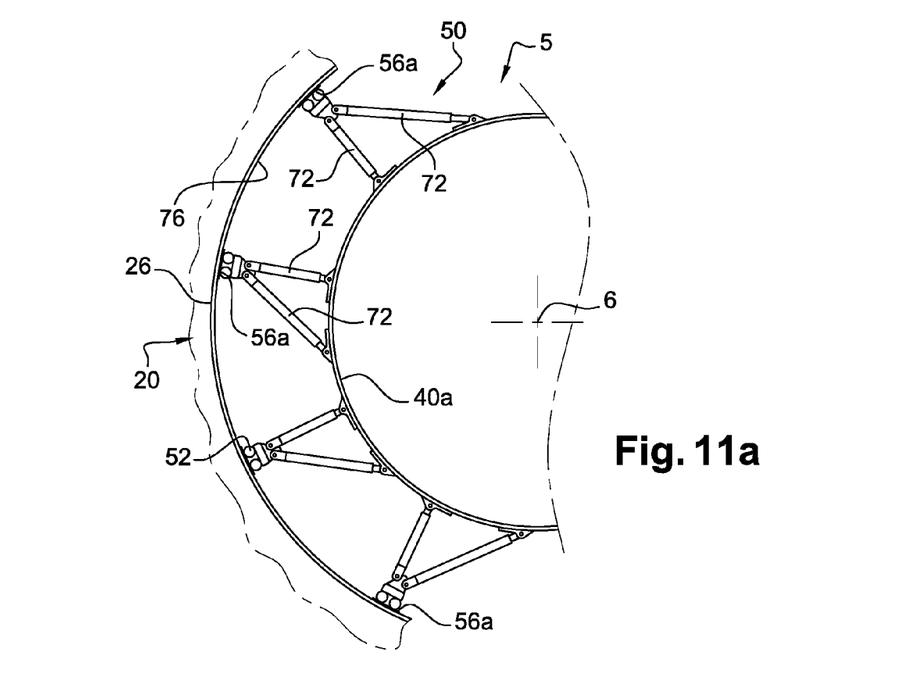
FIG. 11a is a view similar to the preceding figure, with the thrust reversal cowl in the closed position.

Reference is now made to FIGS. 11 and 11a which depict an engine assembly 5 according to another alternative form of the first preferred embodiment of the disclosure herein. This alternative is preferably intended to be installed in the transverse plane P1, with the flexible devices 50 arranged around the other case portion 38a of the central case 38.

In this alternative, the elastically deformable structures or devices 52 can be any one of the forms set out hereinabove, but in this instance are attached to the case portion 38a. They are attached by link rods 72 articulated at their ends. More specifically, associated with each deformable structure or device 52 are two link rods 72 articulated on the one hand to the case part 38a and on the hand to the body 74 for attaching the deformable structure or device 52. The link rods 72 converge at the body 74, but are separated from one another at the case portion 38a. As a result, the link rods are provided in pairs and arranged in a V shape with the point of the V oriented radially towards the outside.

The deformable structure or device 52 here supports the first end piece 56a, some radial distance away from the case portion 38a. This piece 56a cooperates with a second piece fixed to the inner structure 26 of the cowl 20, or alternatively with a bow 76 attached internally to this same structure 26. In the latter instance, the bow 76 is common to all the deformable structures or devices 52 associated with one and the same cowl 20, running along the interior surface of the structure 26. In the event of wear as a result of friction with the first end pieces 56a supported by the elastically deformable structure(s) or device(s) 52, the bow 76 can easily be replaced.

Figure 12:
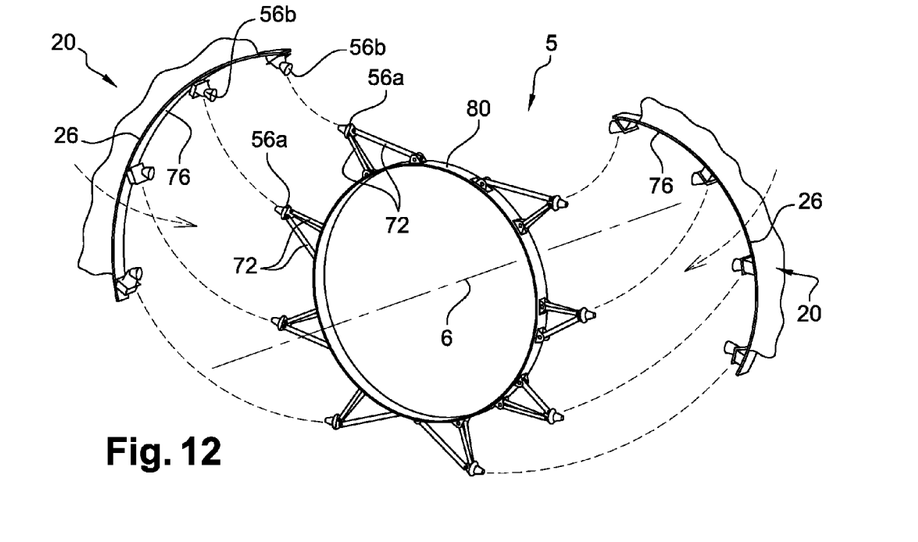
FIG. 12 depicts part of the engine assembly viewed face on with the thrust reversal cowl in the open position, according to a second preferred embodiment of the disclosure herein.
Figure 12A:
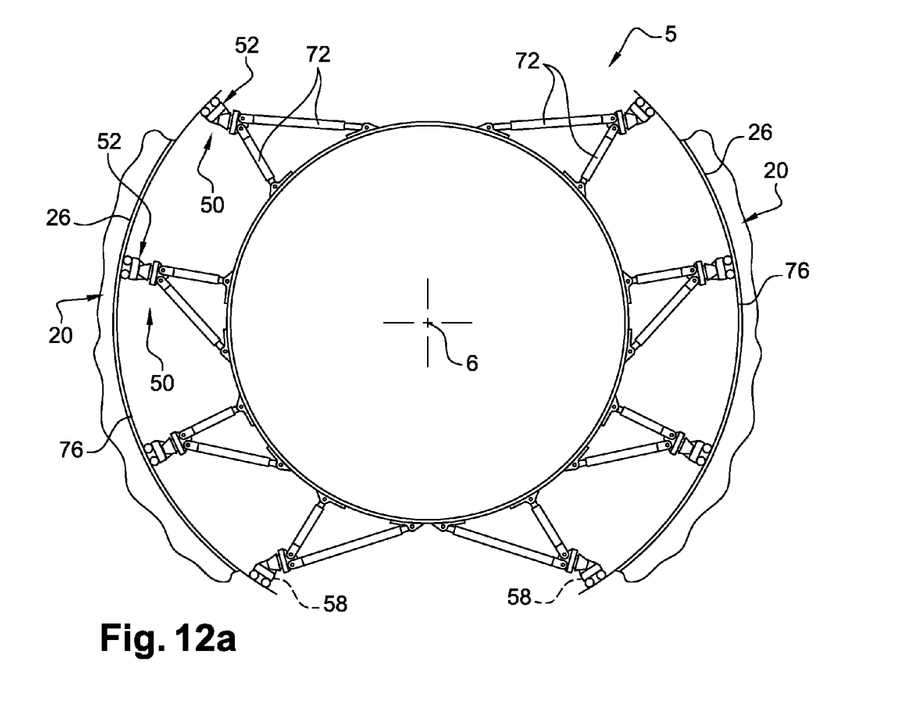
FIG. 12a is a view similar to the preceding figure, with the thrust reversal cowl in the closed position.
Figure 13:
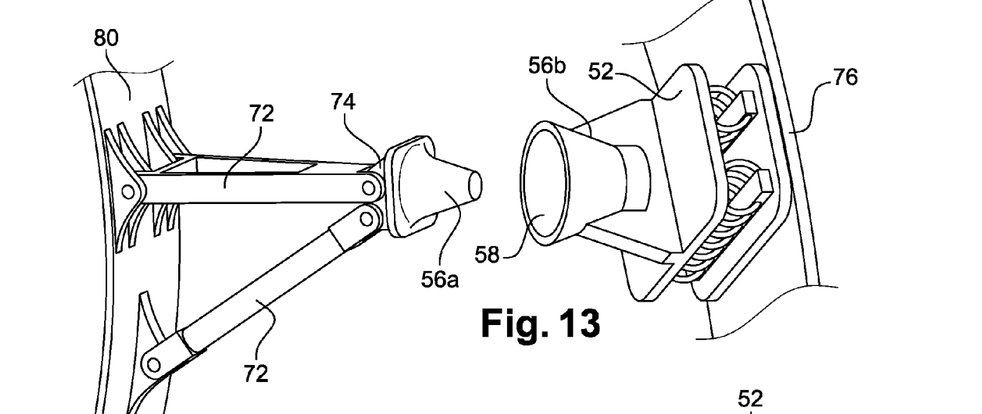
FIGS. 13 and 13a depict one of the flexible devices used in the assembly shown in FIG. 12, in a state as adopted when the thrust reversal cowl is in the open position, and in a state as adopted when the thrust reversal cowl is in the closed position, respectively.
Figure 13A:
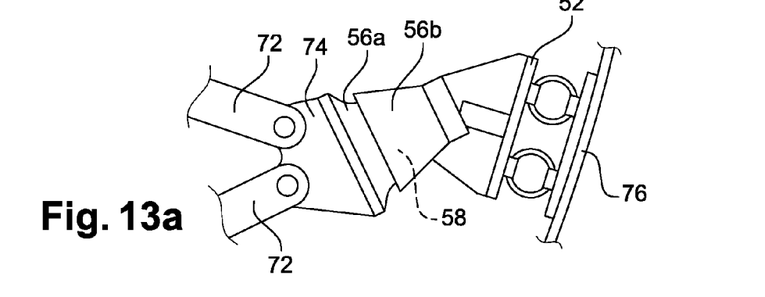

FIGS. 12 to 13a depict a second preferred embodiment of the disclosure herein, in which the flexible devices 50 are preferably intended to be arranged in the transverse plane P1. This second embodiment contrasts with the first embodiment essentially in that the force transmission interface 58 is no longer substantially planar. Specifically, this interface 58 is obtained with a first end piece 56a which is a male element in the form of a finger. The cross section of the finger 56a here is frustoconical, narrowing in the direction radially towards the outside towards the second end piece 56b that constitutes a female element. This second piece 56b is thus in the shape of a socket, the interior surface of which complements the exterior surface of the finger 56a, so that the latter can be housed in the socket when the thrust reversal cowls 20 are in the closed position. The orientations of the finger 56a and of the socket 56b are substantially transverse, so as to allow the one to be introduced into the other at the end of the closure of the cowl 20. The interface 56 is therefore substantially frustoconical, allowing it to transmit force not only in the direction defined by the axis of the finger 56a but also in the other two transverse directions.

The finger 56a is preferably produced as a single piece with the body 74, itself supported in an articulated manner by two link rods 72. At the opposite end, these link rods are articulated directly to the case portion as was described with reference to FIGS. 11 and 11a or indeed are articulated to a belt 80 centred on the axis 6 and fixed around this case portion.

The socket 56b is itself supported fixedly by the deformable structure or device 52 which is itself fixed to the bow 76 or alternatively directly to the inner structure 26 of the cowl.

Figure 14:
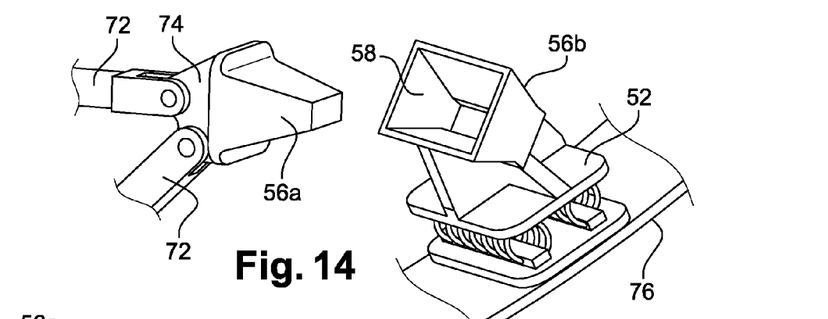
FIGS. 14 and 14a are views similar to those of FIGS. 13 and 13a, with the flexible device as per an alternative form of embodiment.
Figure 14A:
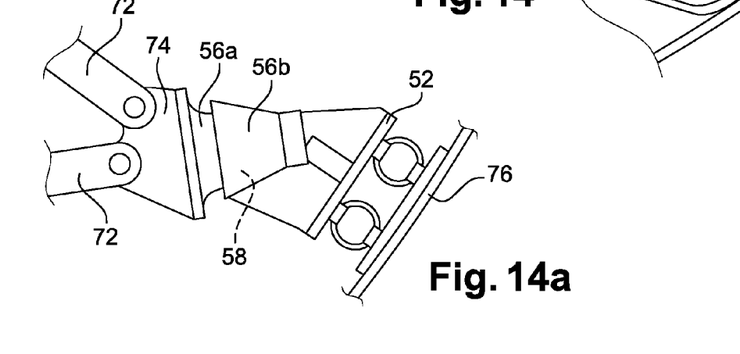

The alternative depicted in FIGS. 14 and 14a provides for a finger 56a and a socket 56b of different shapes, in the shape of truncated pyramids. The same is true of the interface 58 formed by the two complementing contacting surfaces.

Figure 15:
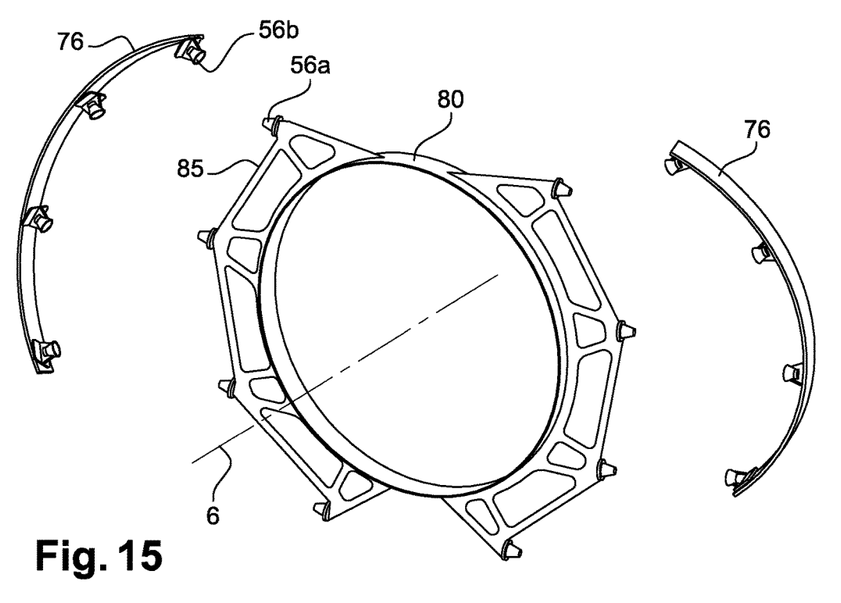
FIGS. 15 and 15a depict views similar to those of FIGS. 12 and 12a, with the engine assembly as per an alternative form of the second embodiment.
Figure 15A:
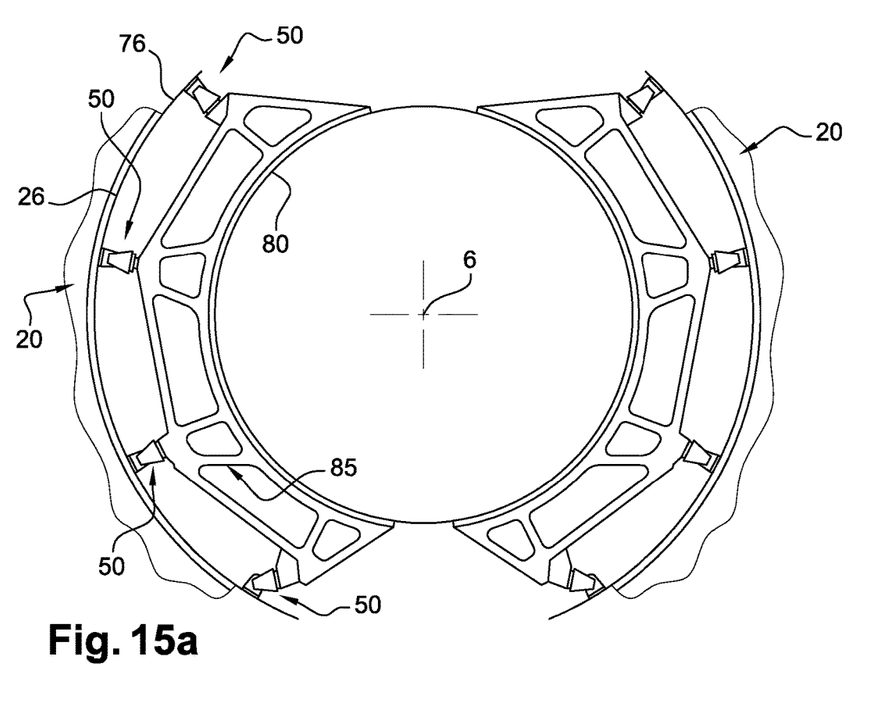
Figure 16:
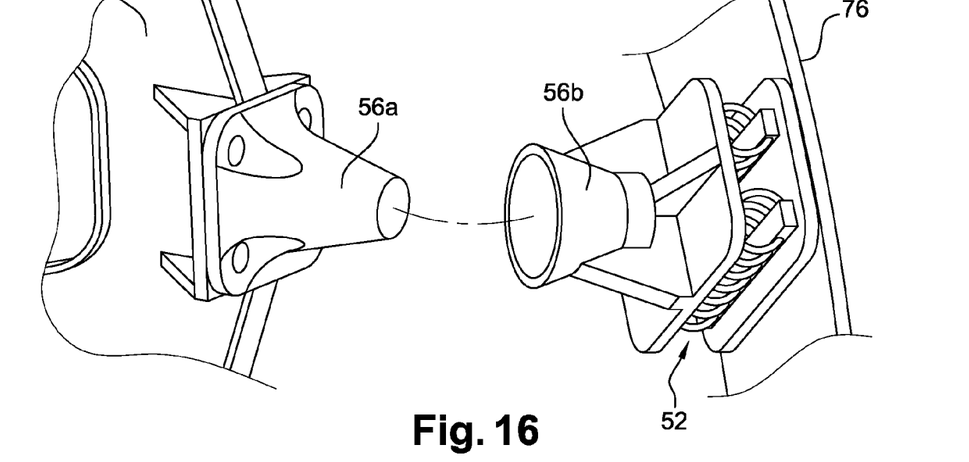
FIGS. 16 and 16a depict one of the flexible devices used in the assembly shown in FIG. 15, in a state as adopted when the thrust reversal cowl is in the open position, and in a state as adopted when the thrust reversal cowl is in the closed position, respectively.
Figure 16A:
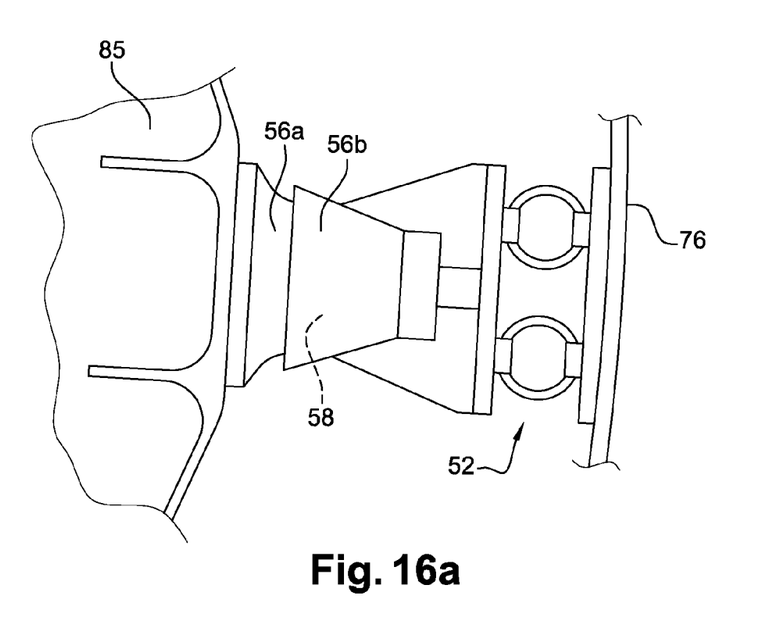

In this second embodiment, the link rods 72 form an intermediate reinforcement arranged and fixed radially between the finger 56a and the case portion surrounded by the belt 80. In the alternative depicted in FIGS. 15 to 16a, the intermediate reinforcements of all the flexible devices 50, which are associated with one and the same cowl 20, are connected to one another in such a way as to form a one-piece component 85. The component 85 is hollow in the manner of a latticework structure, for weight-saving purposes. It passes in an arc shape along the case portion, potentially being fixed to the belt 80 or alternatively directly to this same case portion.

In this alternative, the finger 56a is fixed directly to an external peripheral edge face of the one-piece component 85.

Figure 17:
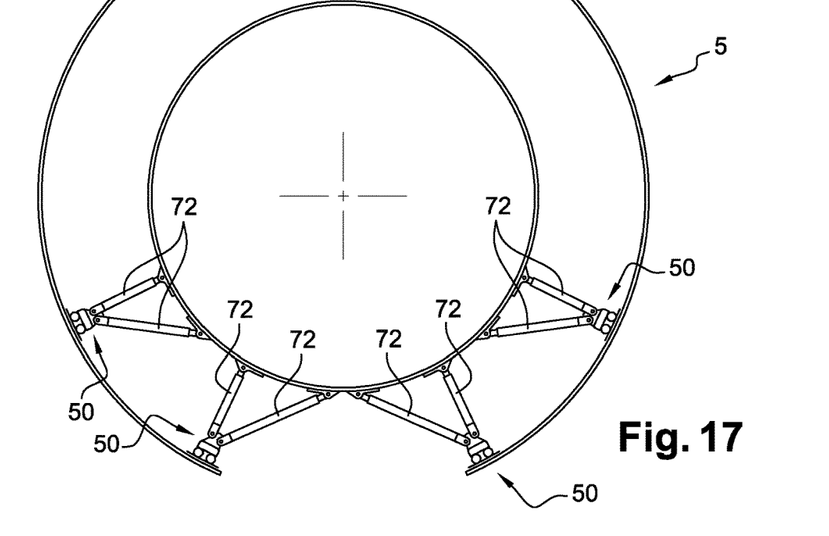
FIGS. 17 and 18 depict engine assemblies incorporating flexible devices according to the first and second embodiments.
Figure 18:
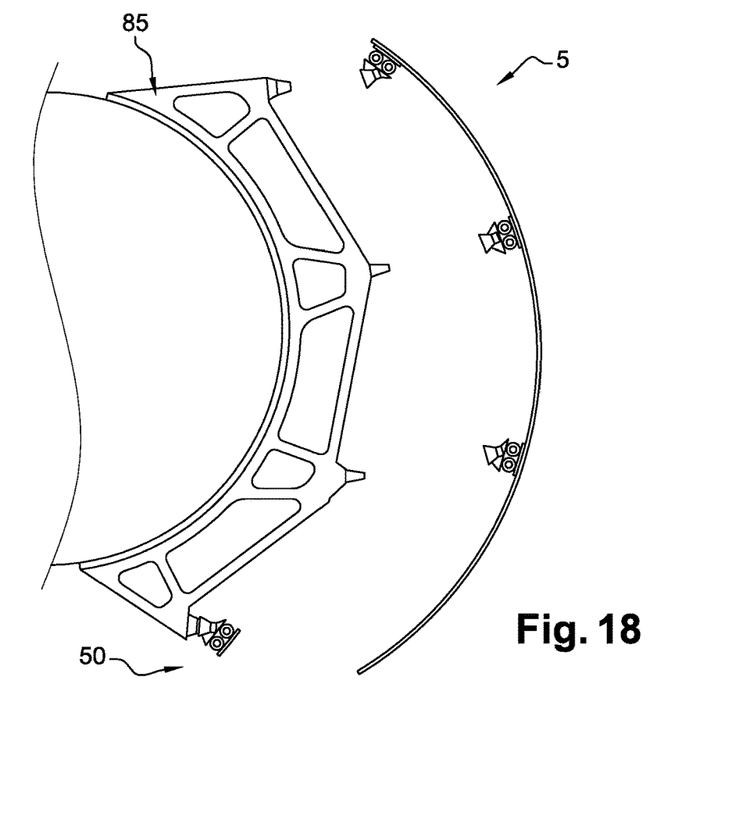

Finally, FIGS. 17 and 18 show embodiments in which the engine assemblies 5 incorporate flexible devices according to each of the first and second preferred embodiments of the disclosure herein.

In this regard, it may be noted that all of the embodiments and alternatives set out hereinabove can be combined and interchanged without departing from the scope of the disclosure herein.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft engine assembly comprising:
a bypass engine;
a device for attaching the engine to a structure of the aircraft, the attachment device comprising a primary structure;
an attachment device for attaching the engine to the primary structure of the attachment pylon; and
a nacelle comprising thrust reversal cowls, each equipped with an inner structure and with an outer structure between them defining a duct for circulation of a bypass flow of the engine, the inner structure being arranged around a case portion of the engine; and
a plurality of flexible devices for transmitting forces which are arranged between the case portion and the inner structures of the thrust reversal cowls, each flexible force transmitting device comprising an elastically deformable device configured so that in a closed position of the thrust reversal cowl, with the engine at a standstill, the deformable device adopts a partial elastic deformation state allowing the force transmitting device to apply a prestress force to the case portion.

2. The aircraft engine assembly according to claim 1, wherein the case portion corresponds to any one of the following portions:
a portion of a central case of the engine enclosing a combustion chamber;
a portion of the central case of the engine enclosing a turbine;
a portion of the exhaust case of the engine; or
a portion of the central case of the engine enclosing a compressor.

3. The aircraft engine assembly according to claim 1, wherein the elastically deformable device is secured to the case portion, and/or secured to the inner structure of the thrust reversal cowl.

4. The aircraft engine assembly according to claim 1, further comprising a plurality of rigid force transmitting devices arranged between the case portion and the inner structures of the thrust reversal cowls, each rigid force transmitting device being arranged so that in the closed position of the thrust reversal cowl, with the engine at a standstill, a radial clearance remains between the rigid device and the case portion or between the rigid device and the inner structure of the thrust reversal cowl, so that the rigid force transmitting device is in an inactive state.

5. The aircraft engine assembly according to claim 1, wherein distribution of the flexible force transmitting devices about a longitudinal axis of the engine, in a circumferential direction thereof, is irregular.

6. The aircraft engine assembly according to claim 5, wherein the distribution is such that density of flexible force transmitting devices arranged in a half-section of the engine opposite to the attachment device is greater than a density of force transmitting devices arranged in another half-section of the engine situated facing the attachment device.

7. The aircraft engine assembly according to claim 1, wherein the elastically deformable device is one of the following elements, or of a combination thereof:
a spiral spring;
a spiral spring operating in compression;
a leaf spring having one or more leaves;
a circular cables spring;
an elastomer block;
a metal cushion.

8. The aircraft engine assembly according to claim 1, wherein each flexible force transmitting device comprises a force transmitting interface defined by a first end piece secured to the case portion, and by a second end piece secured to the inner structure of the thrust reversal cowl.

9. The aircraft engine assembly according to claim 8, wherein the first and second end pieces are contacting plates, defining a substantially planar interface.

10. The aircraft engine assembly according to claim 9, wherein the second end piece, in a form of a plate, is fixed to one end of the elastically deformable device, and/or in that the first end piece, in a form of a plate, is fixed to the case portion.

11. The aircraft engine assembly according to claim 8, wherein, of the first and second end pieces, one is a male element in a form of a finger having a cross section that narrows in a direction of the other end piece, the latter being a female element in a form of a socket accepting the finger and having a shape that complements a shape of the finger.

12. The aircraft engine assembly according to claim 11, wherein the first end piece is secured to an intermediate reinforcement fixed to the case portion, the intermediate reinforcement being arranged between the first end piece and the case portion.

13. The aircraft engine assembly according to claim 12, wherein the intermediate reinforcements associated with at least two flexible devices that are directly consecutive in a circumferential direction are connected to one another forming a one-piece component.

14. The aircraft engine assembly according to claim 12, wherein each intermediate reinforcement comprises link rods articulated at their ends, comprising pairs of link rods arranged in a V with their point oriented radially towards outside.

15. An aircraft comprising at least one engine assembly fixed under a wing of the aircraft or on a fuselage of the aircraft, the engine assembly comprising:
- a bypass engine;
- a device for attaching the engine to a structure of the aircraft, the attachment device comprising a primary structure;
- an attachment device for attaching the engine to the primary structure of the attachment pylon; and
- a nacelle comprising thrust reversal cowls, each equipped with an inner structure and with an outer structure between them defining a duct for circulation of a bypass flow of the engine, the inner structure being arranged around a case portion of the engine; and
- a plurality of flexible devices for transmitting forces which are arranged between the case portion and the inner structures of the thrust reversal cowls, each flexible force transmitting device comprising an elastically deformable device configured so that in a closed position of the thrust reversal cowl, with the engine at a standstill, the deformable device adopts a partial elastic deformation state allowing the force transmitting device to apply a prestress force to the case portion.

* * * * *